(12) United States Patent
Rau et al.

(10) Patent No.: US 8,495,575 B2
(45) Date of Patent: Jul. 23, 2013

(54) SYSTEMS AND METHODS FOR ANALYZING TEST COVERAGE AT AN ORGANIZATIONAL LEVEL

(75) Inventors: Stefan Rau, Dielheim (DE); Uwe Bloching, Nussloch (DE)

(73) Assignee: SAP AG, Walldorf (DE)

( * ) Notice: Subject to any disclaimer, the term of this patent is extended or adjusted under 35 U.S.C. 154(b) by 850 days.

(21) Appl. No.: 12/633,806

(22) Filed: Dec. 9, 2009

(65) Prior Publication Data
US 2011/0138358 A1   Jun. 9, 2011

(51) Int. Cl.
*G06F 9/44* (2006.01)

(52) U.S. Cl.
USPC .......................................................... 717/124

(58) Field of Classification Search
USPC ................................. 717/124–135
See application file for complete search history.

(56) References Cited

U.S. PATENT DOCUMENTS
7,617,415 B1 * 11/2009 Kadakia ........................ 714/26

* cited by examiner

*Primary Examiner* — Ted T Vo (57) ABSTRACT

Disclosed are methods and systems for calculating test coverage of a software organizational schema. The method and systems involve retrieving the software organizational schema associated with an application, receiving an assigned weight factor to the one or more software organizational schema components associated with the application, determining a number of processed code lines and a total number of the code lines associated with the one or more software organizational schema components, calculating a test coverage for the one or more software organizational schema components based on the weight factor, the number of processed code lines and the total number of code lines of the software organizational schema component.

20 Claims, 6 Drawing Sheets

SYSTEMS AND METHODS FOR ANALYZING TEST COVERAGE AT AN ORGANIZATIONAL LEVEL

FIELD OF THE INVENTION

The field generally relates to software testing and more specifically to analyzing the coverage of software code subjected to testing.

BACKGROUND OF THE INVENTION

Today's business applications are based on division of labor and collaboration. The assignment of specific tasks to certain executable and reusable components of software enables creation of complex business applications through composition of various software components. A software component itself is either composed of other sub components or is made of units of work which keep track of the context and take into account relationships, data and rule based constraints.

The software components that make up an application are tested to assure the quality (e.g., in terms of its functionality, robustness and performance) in order to guarantee the quality of the overall application itself. Test coverage is one indicator of the effectiveness of the testing. However, determining the test coverage of the software components in a manner that is contextual to the requirements of various testing scenarios can be a challenge. Test coverage information can be very useful if in addition to determining whether the testing is adequate it is also directed to the code that is of interest. For example, results of the test coverage analysis can be used to identify software components for which additional tests are required to raise the overall test coverage indices. Moreover, test coverage results can be used to calculate Quality Key Process Indicators (KPIs) that allow for a formal description of the quality of part of software.

SUMMARY OF THE INVENTION

Disclosed are methods and systems for calculating test coverage of a software organizational schema at an organizational level. In one aspect, the methods and systems involve retrieving the software organizational schema associated with an application, the software organizational schema includes one or more software organizational schema components and associated code lines. According to another aspect, an assigned weight factor of the one or more software organizational schema components associated with the application is received. A number of processed code lines and a total number of the code lines associated with the one or more software organizational schema components are determined. A test coverage for the one or more software organizational schema components are calculated based on the weight factor, the number of processed code lines and the total number of code lines of software organizational schema component.

In one embodiment, whether the test coverage satisfies quality indices required by an organization is determined. If the test coverage satisfies the required quality indices of the organization, the test coverage is accepted. If the test coverage does not satisfy the required quality indices of the organization, at least one test which satisfies the quality indices is determined. The test coverage is displayed to a user.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for analyzing test coverage at an organizational level are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Composite software made up of various components and sub-components can be understood in terms of one or more organizational schemas that explain how the various software components are organized to make up the whole. Several such software organizational schemas can be used to describe the same piece of software depending on various grouping strategies. For instance, if the grouping strategy is along the dimension of tasks performed by the software components then the software organizational schema groups the software components according to the tasks they perform (e.g., user interface, data services, business logic and the like). Some such organizational schema components may have a hierarchy and can be represented in a tree format. In order to express hierarchy, where it exists, the organizational schema components can be further referred to as primary organizational schema component, secondary organizational schema component, tertiary organizational schema component and so on. However, the groupings that are associated with various organizational schemas need not necessarily express a hierarchy.

For example, if the primary software organizational schema component is human resources business logic, the one or more secondary software organizational schema components associated with the primary software organizational schema component are payroll data, taxes data and so on. Test coverage can be calculated for the primary software organizational schema component and each of the secondary software organizational schema components. In yet another example, where software components are maintained by different departments, analyzing test coverage along the departmental dimension enables the organization to find out how well each department has performed in the responsibilities assigned to them.

Figure 1:
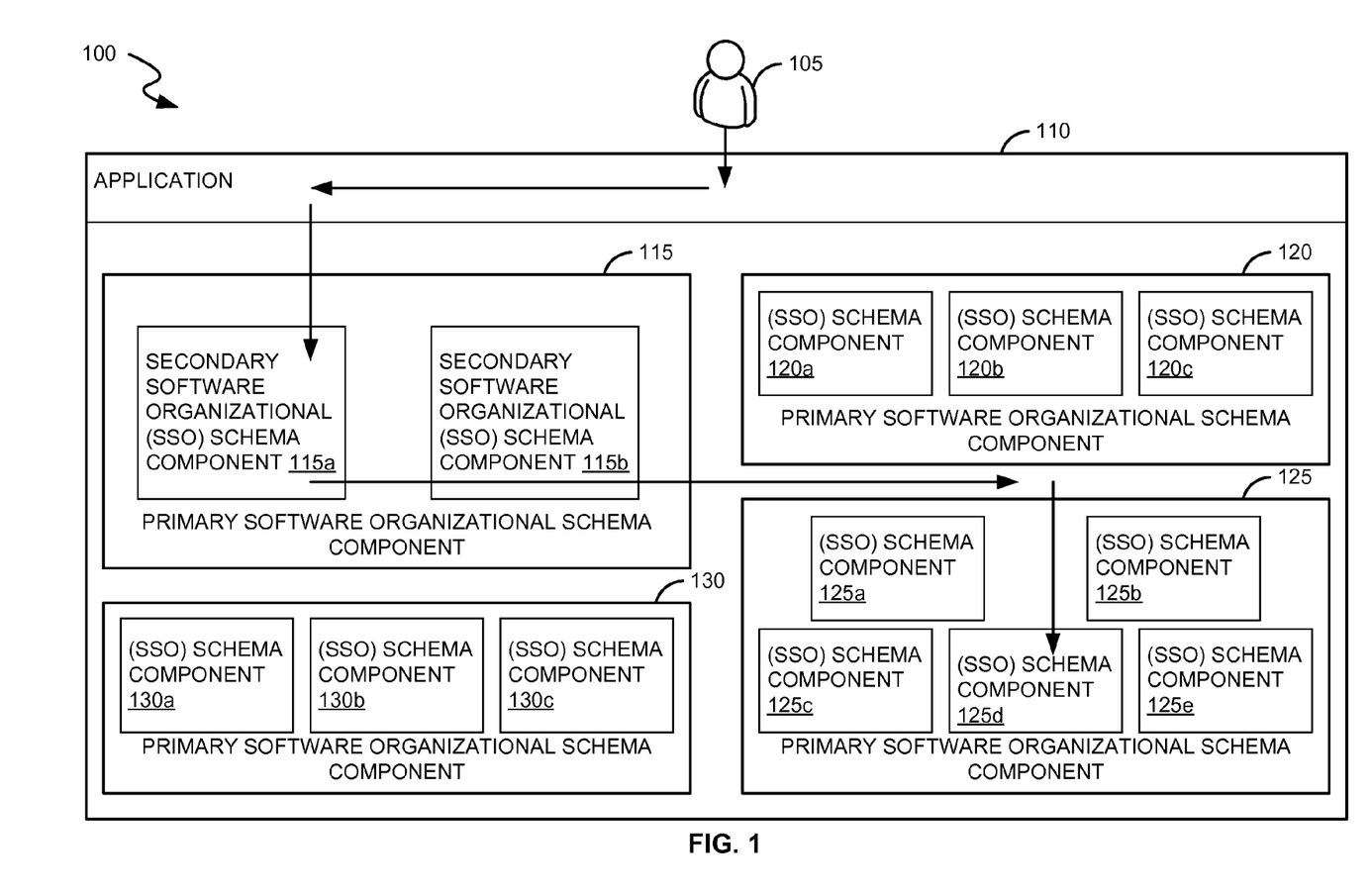
FIG. 1 is a block diagram illustrating an exemplary software organizational schema associated with an application according to an embodiment of the invention.

FIG. 1 is a block diagram illustrating an exemplary software organizational schema associated with an application according to an embodiment of the invention. Consider a user 105 interacting with an application 110 associated to organizational schema 100. The software organizational schema 100 includes one or more primary software organizational schema components and one or more secondary software organizational schema components associated with the application 110. The application 110 includes primary software organizational schema components 115, 120, 125 and 130. The primary software organizational schema component 115 includes secondary software organizational schema components 115a and 115b. The primary software organizational schema component 120 includes secondary software organizational schema components 120a, 120b and 120c. The primary software organizational schema component 125 includes secondary software organizational schema components 125a, 125b, 125c, 125d and 125e. The primary software organizational schema component 130 includes secondary software organizational schema components 130a, 130b and 130c. The software organizational schema 100 is an example of a hierarchical schema. The software organizational schema need not necessarily be hierarchical. The software organizational schema may also just include one software organizational schema component.

The software organizational schema 100 illustrates the software organizational schema components that were called while executing a user request to the application. From a testing point of view, it may be important to record the software organizational schema components and code lines that have been processed during a test run. The recording allows creating statements about which software organizational schema components have been processed and it also calculates test coverage for the software organizational schema components involved. In this exemplary scenario, the software organizational schema components that were called while executing the user request are 115→115a→115b→125→125d. Having such a trace of the code portions that were touched in a test run allows one the ability to determine the coverage of the test which can be one measure of its effectiveness.

Figure 2:
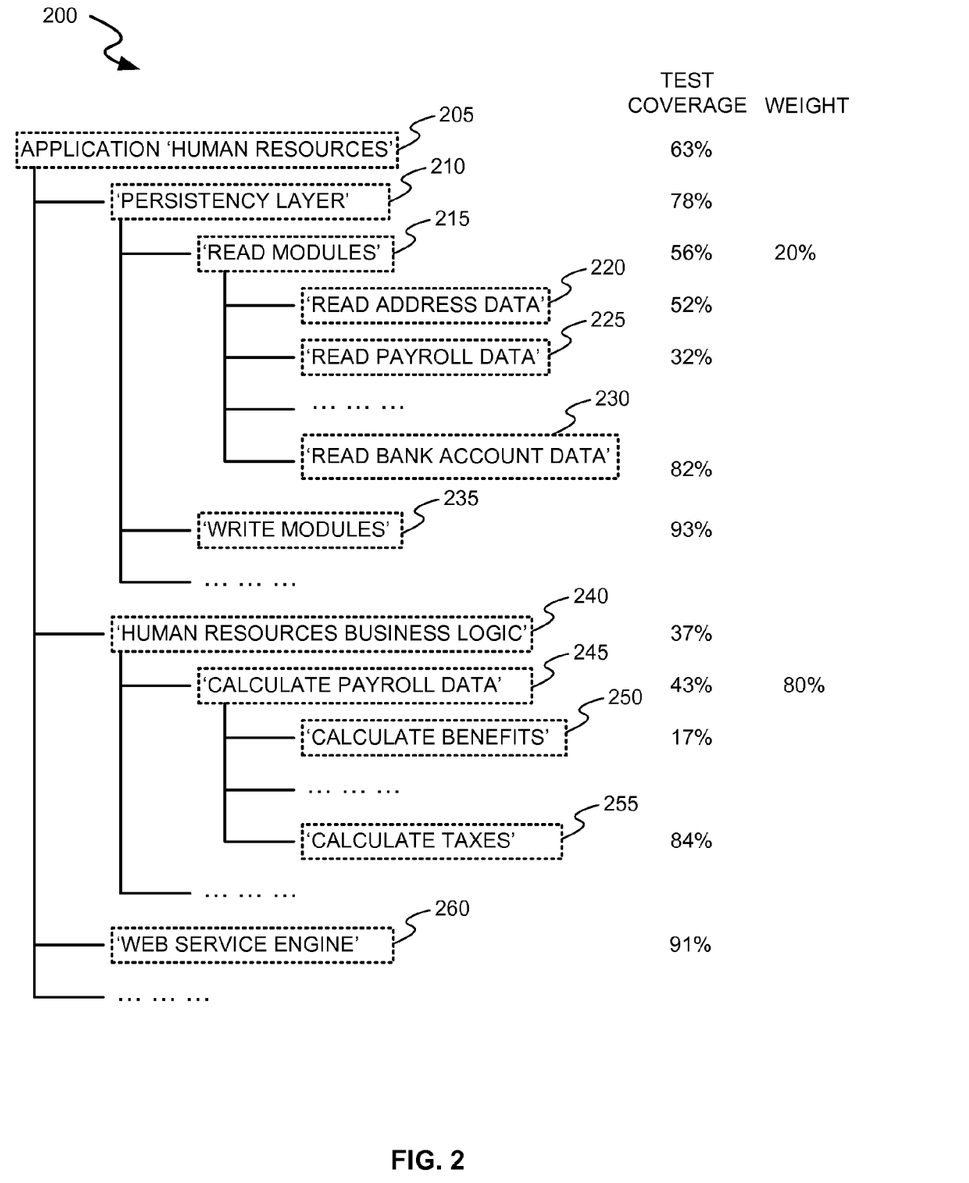
FIG. 2 is block diagram illustrating yet another view of exemplary hierarchical software organizational level schema in a tree format according to an embodiment of the invention.

FIG. 2 is block diagram illustrating yet another view of exemplary hierarchical software organizational level schema in a tree format according to an embodiment of the invention. The software organizational schema 200 is associated with a human resource application 205. The human resource application 205 includes 3 primary software organizational schema components namely Persistency layer 210, Human Resources Business Logic 240 and Web Service Engine 260. The primary software organizational schema components include secondary software organizational schema components associated with them. The secondary software organizational schema component read modules 215 has more than one associated software organizational components (e.g., read address data 220, read payroll data 225, read bank account data 230 and so on). Another secondary software organizational schema component "calculate payroll data" 245 also has more than one associated software organizational components (e.g., calculate benefits 250, calculate taxes 255 and so on). Thus, in this example the schema describes the organization of the Human resources application 205 as being made up of various components. Based on this schema, the test coverage metrics too can be calculated and viewed along the dimensions of the software organizational schema expressed in FIG. 2. The test coverage values calculated for the components can be combined to derive a number for the whole application. Furthermore, if not all code is equally important, the relative importance of the various components can be expressed by adding weight factors. In an embodiment, the test coverage values are independently calculated and displayed for the one or more software organizational schema components. In another embodiment, the test coverage values calculated for the whole application is displayed as an overall test coverage value of the application. The overall test coverage value of the application is a weighted average value of all the software organizational schema components associated with the application.

Figure 3A:
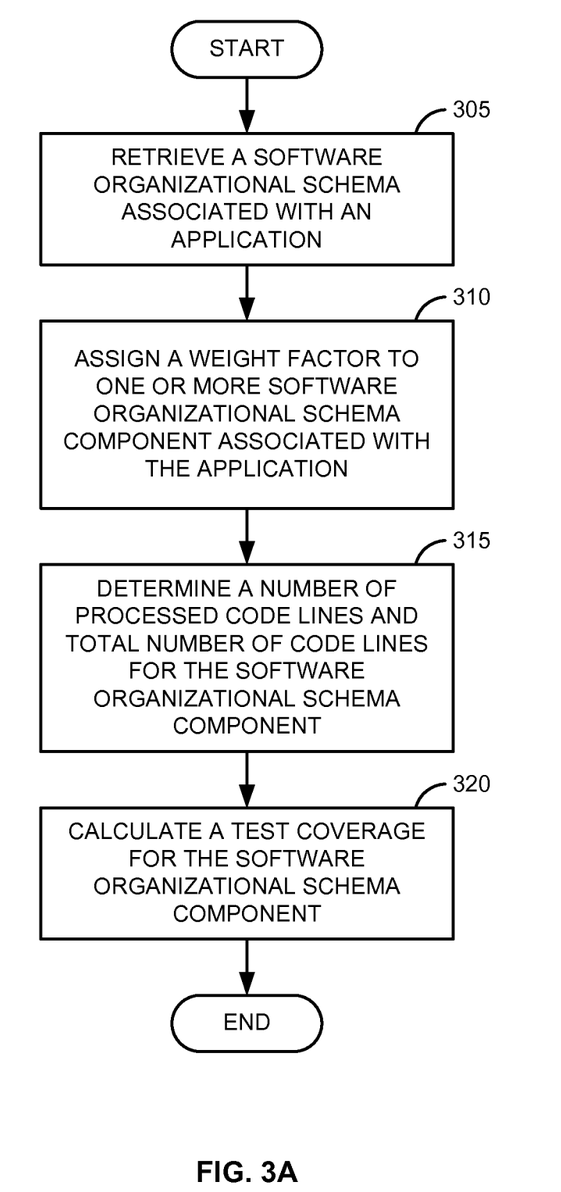
FIG. 3A is a flow diagram illustrating an exemplary process for calculating test coverage of an organizational schema according to an embodiment of the invention.

FIG. 3A is a flow diagram illustrating an exemplary process for calculating test coverage of a software organizational schema according to an embodiment of the invention. At process block 305, a software organizational schema associated with an application is retrieved. The software organizational schema includes associated code lines that correspond to the dimensions of the schema. At process block 310, an assigned weight factor of the one or more software organizational schema components associated with the application is received. The weight factors may be chosen to signify the importance of the software organizational schema component. Any number of weighting techniques can be used. The weight factor may be a percentage or a factor number, for instance. The software organizational schema component with a highest weight factor is considered as a most significant software organizational schema component of the software organizational schema. The weight factor may be assigned to one or more software organizational components in the software organizational schema. Any component that does not have a weight factor associated with it will be considered to have no weight at all.

Consider the exemplary weight factors assigned to software organizational schema 200 in FIG. 2. A weight factor of 80% is assigned to Human Resource Business Logic 240 and weight factor of 20% is assigned to Persistency Layer 210. According to this scenario, when calculating a test coverage for the application "Human Resources" software organizational schema component "Human Resource Business Logic" is considered as a more significant software organizational schema component than "Persistency Layer" software organizational schema component.

In an embodiment, if the assigned weight factor for the software organizational schema component is zero, then that software organizational schema component is ignored, meaning the test coverage is not calculated for that software organizational schema component. In another embodiment, if the software organizational schema associated with the application is significantly large (e.g., the application includes more than 20 primary software organizational components) then the weight factor can be assigned to primary software organizational schema components as well.

At process block 315, a number of processed code lines and a total number of code lines for the software organizational schema component are determined. At process block 320, test coverage for the software organizational schema component is calculated.

According to one embodiment, the test coverage may be calculated using the following equation:

$$\text{Test Coverage} = \frac{\sum_{m=1}^{m=n} w_m \cdot pcl_m}{\sum_{m=1}^{m=n} w_m \cdot cl_m} \quad (1)$$

with $$\sum_{m=1}^{m=n} w_m \cdot cl_m > 0$$

where, $w_m$ = weight factor of software organizational schema component m $cl_m$ = number of code lines of software organizational schema component m $pcl_m$ = number of processed codes lines of software organizational schema component m.

In general terms, the equation (1) to calculate test coverage at an organizational level can be reduced to:

$$\text{Test Coverage} = \frac{\sum \text{Processed code lines of organizational level}}{\sum \text{Code lines of organizational level}} \quad (2)$$

Consider a scenario 1 where the test coverage of the software organizational schema component is 100%. This means, during testing process all code lines in the software organizational schema component are processed for scenario 1. Consider scenario 2 where the test coverage of the software organizational schema component is 80%. For scenario 2, during the testing process some of the code lines were not tested. Therefore, alternate tests may have to be performed for scenario 2 to achieve 100% test coverage.

Figure 3B:
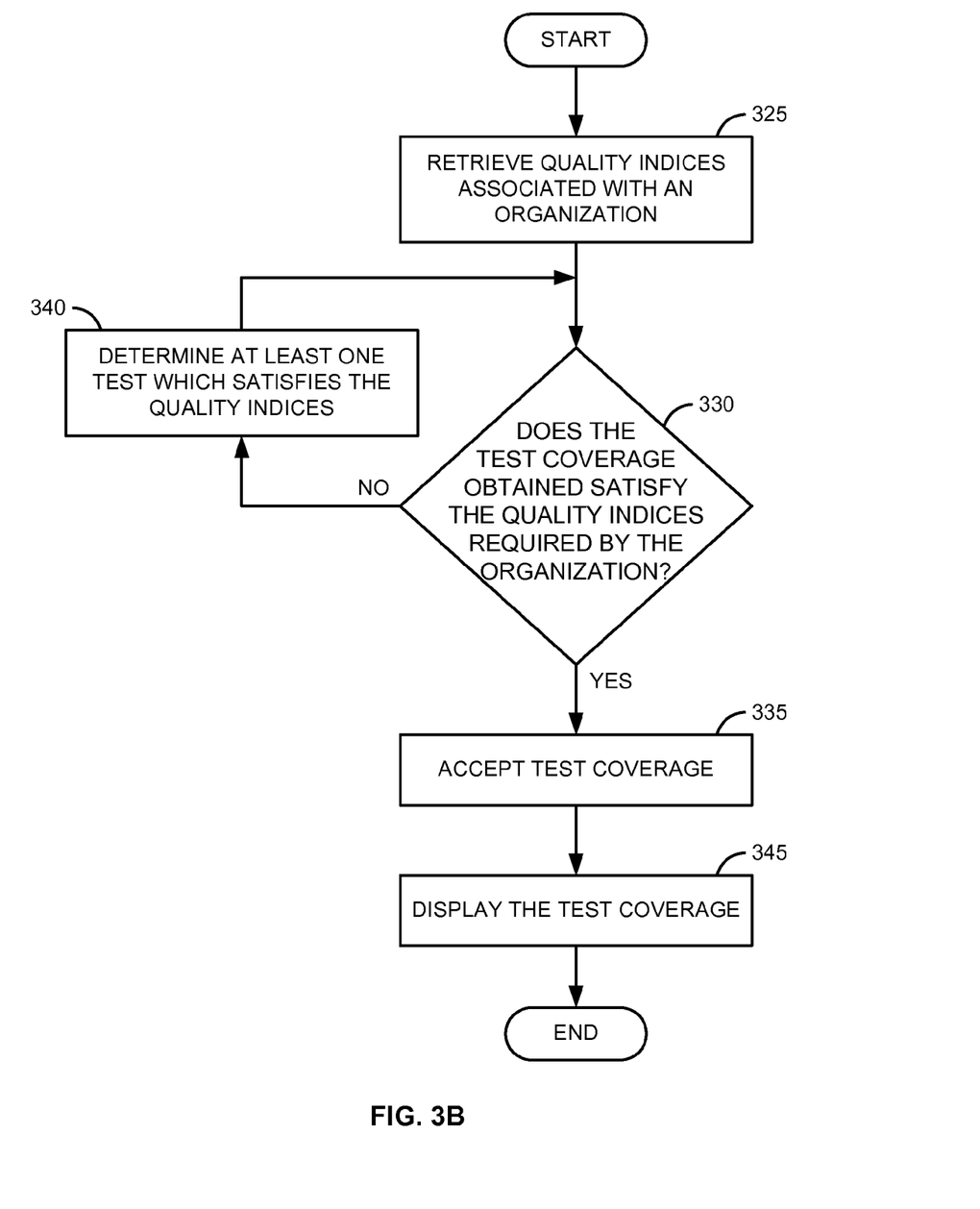
FIG. 3B is a flow diagram for determining a quality indices for the test coverage according to an embodiment of the invention.

FIG. 3B is a flow diagram for determining a quality indices for the test coverage according to an embodiment of the invention. At process block 325, quality indices associated with an organization are retrieved. The quality indices are a predefined range of test coverage values defined by the organization as conforming to their standards of quality. The quality indices may be stored and retrieved from a database. At decision block 330, it is determined whether the test coverage obtained satisfies the quality indices required by the organization. The test coverage is calculated using the process explained in FIG. 3A. If the test coverage satisfies the quality indices required by the organization, the process proceeds to process block 335. At process block 335, the test coverage is accepted. At process block 345, the test coverage is displayed.

If the test coverage does not satisfy the quality indices required by the organization, then the process proceeds to process block 340. At process block 340, at least one test is determined to increase the test coverage to satisfy the quality indices. At process block 340, the test configurations may be changed and the test is run again until a test that meets the quality at 335 is found. In some cases, alternative tests may have to be carried out in order to meet the quality indices.

In an embodiment, the quality indices include an acceptable range, an intermediate range and an unacceptable range. For example, if the quality index defined by the organization for a software organizational schema component is 80%-85%, the test coverage obtained is 82%, then the test coverage is said to have an acceptable range.

For example, if the quality index defined by the organization for a software organizational schema component is 75%-80%, the obtained test coverage is 74.5%, then the test coverage is said to have an intermediate range.

For example, if the quality index defined by the organization for a software organizational schema is 60%-80%, the obtained test coverage is 50%, then the test coverage is said to have a unacceptable range. In such cases, alternative tests are determined to at least achieve a test coverage which falls in the intermediate range.

In another embodiment, color codes are assigned to the quality indices. The color code for the acceptable range, the intermediate range and the unacceptable range are green, yellow and red colored respectively. The color codes assigned to the quality indices may depend on the standards set by the organization. The color codes may vary from one organization to another. The quality indices may depend on various factors like organizational policy, type of software organizational schema component tested and so on. In yet another embodiment, status for the quality indices is identified by a square, triangle and a circle. Square, triangle and circle indicate acceptable range, intermediate range and unacceptable range respectively. Again, the shapes to identify the quality indices may depend on the organization and it may vary from one organization to another. The color codes and shapes are not limited to the above listed illustrations. The color codes and shapes can be used alone or in combination with one another.

Figure 4:
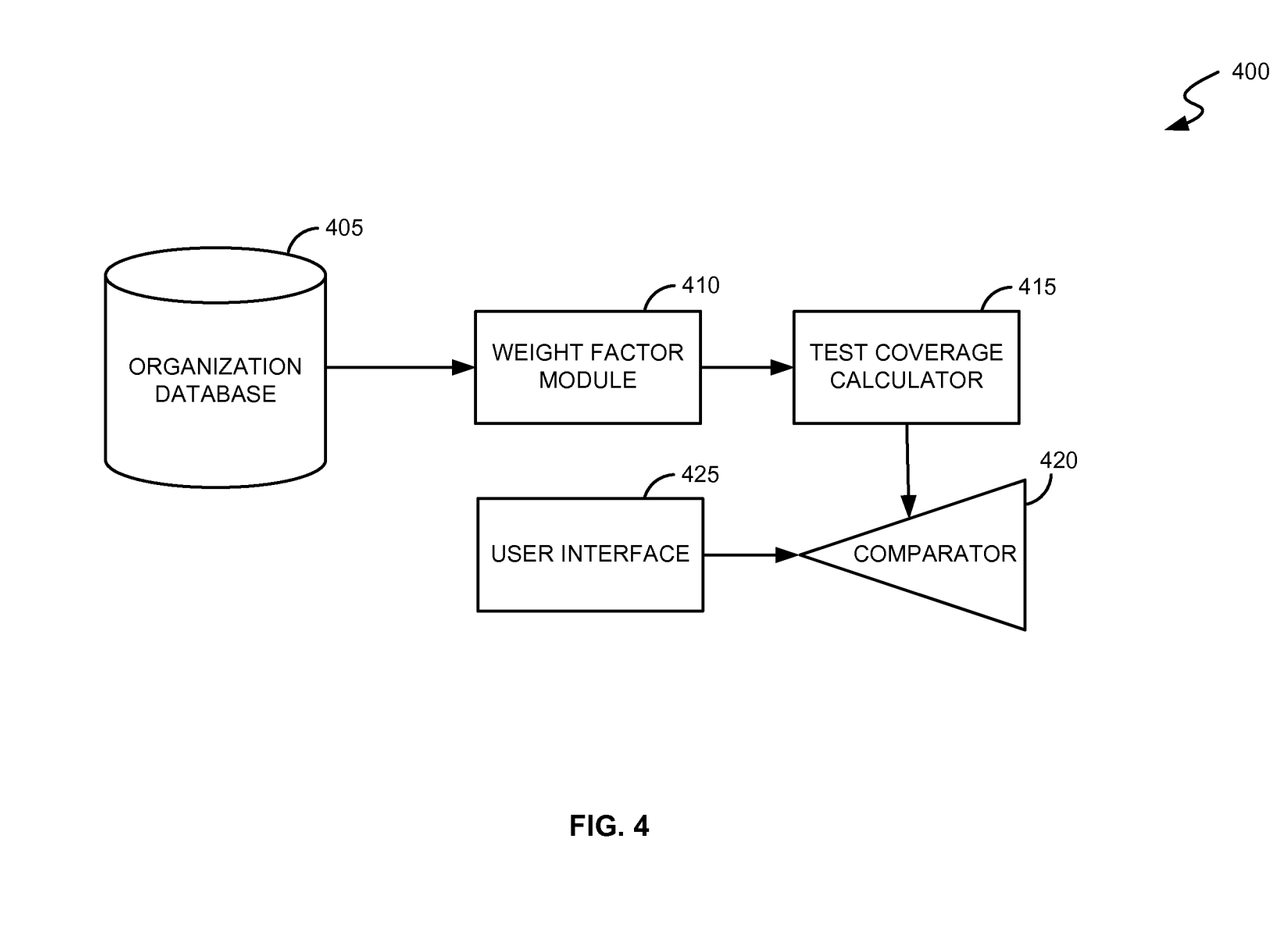
FIG. 4 is a block diagram of an exemplary system to calculate test coverage of an organizational schema according to an embodiment of the invention.

FIG. 4 is a block diagram of an exemplary system to calculate test coverage of an organizational schema according to an embodiment of the invention. Some embodiments of the invention may include the above-described methods as being written as one or more software components. These components, and the functionality associated with them may include an organization database 405, weight factor module 410, test coverage calculator 415, comparator 420 and a user interface 425.

System 400 includes organization database 405 to store a software organizational schema associated with an application. The software organizational schema includes one or more software organizational schema components and associated code lines. The organization database can also store a hierarchical software organizational schema. The organization database 405 also stores quality indices defined by the organization. A data indicating a number of processed code lines and a total number of code lines associated with the one or more software organizational schema components is determined in a memory (not shown in the figure). A processor (not shown in the figure) in communication with the memory and storage may include instructions for the weight module 410, test coverage calculator 415 and the comparator 420 to perform the required operations. The weight factor module 410 assigns a weight factor to one or more software organizational schema components of the software organizational schema. A test coverage calculator 415 calculates test coverage based on the weight factor, the number of processed lines and the total number of the code lines of the software organizational schema component. The test coverage calculator 415 uses equation (1) to calculate the test coverage. The comparator 420 compares if the test coverage satisfies the quality indices required by an organization. If the test coverage satisfies the quality indices required by the organization, then the test coverage is accepted. If the test coverage does not satisfy the quality indices required by the organization, then an alternative test which is able to satisfy the quality indices of the organization is determined. The alternative tests may be stored in the memory and processed by the processor. The test coverage is displayed to a user on a user interface 425. The test configurations of the test may be changed and the test is run again until a test that meets the quality indices. In some cases, alternative tests may have to be carried out in order to meet the quality indices.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable medium as instructions. The term "computer readable medium" should be taken to include a single medium or multiple media that stores one or more sets of instructions. The term "computer readable medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer-readable media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 5:
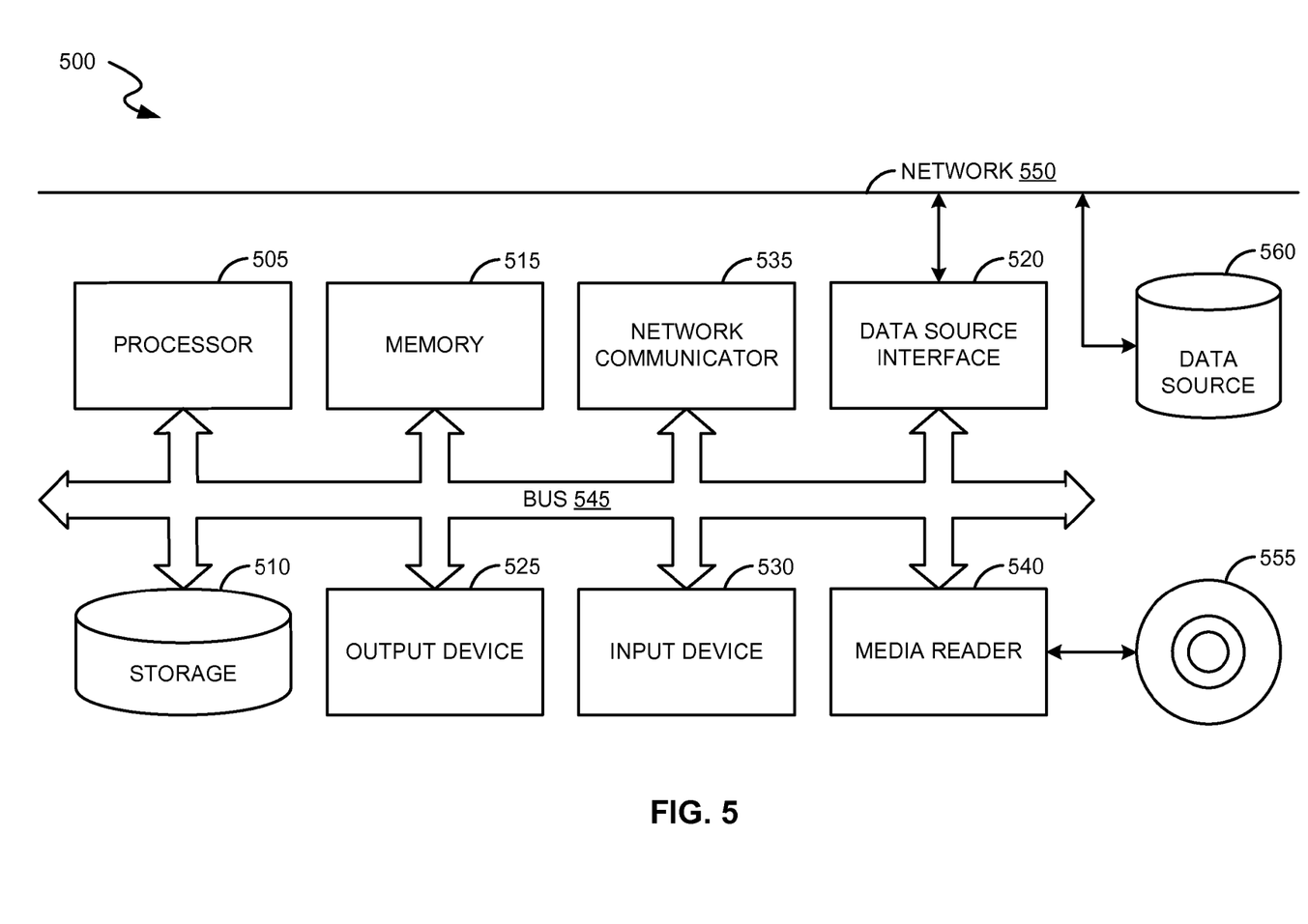
FIG. 5 is a block diagram of an exemplary computer system according an embodiment of the invention.

FIG. 5 is a block diagram of an exemplary computer system 500 according an embodiment of the invention. The computer system 500 includes a processor 505 that executes software instructions or code stored on a computer readable medium 555 to perform the above-illustrated methods of the invention. The computer system 500 includes a media reader 540 to read the instructions from the computer readable medium 555 and store the instructions in storage 510 or in random access memory (RAM) 515. The storage 510 provides a large space for keeping static data where at least some instructions could be stored for later execution. The stored instructions may be further compiled to generate other representations of the instructions and dynamically stored in the RAM 515. The processor 505 reads instructions from the RAM 515 and performs actions as instructed. According to one embodiment of the invention, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. Each of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments the data source 560 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to tangibly store instructions, which when executed by a computer, cause the computer to perform operations comprising:

retrieving a software organizational schema associated with an application, comprising one or more hierarchical software organizational schema components including one or more primary software organizational schema components, one or more secondary software organizational schema components associated with the primary software organizational components, one or more tertiary software organizational schema components associated with the secondary software organizational components, and a plurality of associated code lines;

for the retrieved software organizational schema, receiving a weight corresponding to one or more of the primary software organizational schema components, the secondary software organizational schema components, and the tertiary software organizational schema components;

executing a test-run of the application to determine a number of processed code lines and a total number of the code lines associated with the hierarchical software organizational schema components;

based on the weight, the number of processed code lines, and the total number of code lines associated with the hierarchical software organizational schema components, calculating a test coverage value for the software organizational schema; and determining a match between the calculated test coverage value and a defined standard, the defined standard indicated by one or more quality indices, wherein, in response to the match of the calculated test coverage value with the defined standard, accepting the test coverage value, and wherein, in response to a failure to match the calculated test coverage value with the defined standard, recursively executing the test-run of the application to calculate the test coverage value that matches the defined standard.

2. The article of manufacture in claim 1 further comprising: defining the quality indices to comply with the defined standard.

3. The article of manufacture of claim 2, wherein the quality indices are based on one or more organizational policies, and one or more types of software organizational schema components associated with the application 4. The article of manufacture of claim 2 further comprising representing the quality indices by one or more shapes, one or more colors, and a combination thereof.

5. The article of manufacture in claim 1, further comprising instructions related to: displaying test coverage values of the primary software organizational schema components, the secondary software organizational schema components, and the tertiary software organizational schema components on a user interface.

6. The article of manufacture in claim 5, further comprising instructions related to: displaying an overall test coverage value associated with an application.

7. The article of manufacture of claim 6, wherein the overall test coverage value for the software organizational schema is a weighted average of values of the hierarchical software organizational components associated with the application.

8. The article of manufacture in claim 1, wherein the quality indices comprises a predefined range of test coverage values.

9. The article of manufacture in claim 1, wherein the quality indices comprises an acceptable range, an intermediate range, and an unacceptable range.

10. The article of manufacture in claim 1, wherein calculating the test coverage value for the software organizational schema components comprises calculating test coverage values for the primary software organizational schema components, the secondary software organizational schema components, and the tertiary software organizational schema components.

11. A computer implemented method for calculating test coverage of a software organizational schema, comprising:

retrieving the software organizational schema associated with an application, comprising one or more hierarchical software organizational schema components including one or more primary software organizational schema components, one or more secondary software organizational schema components associated with the primary software organizational schema components, one or more tertiary software organizational schema components associated with the secondary software organizational schema components, and a plurality of associated code lines;

for the retrieved software organizational schema, receiving a weight corresponding to one or more of the primary software organizational schema components, the secondary software organizational schema components, and the tertiary software organizational schema components;

executing a test-run of the application to determine a number of processed code lines, and a total number of the code lines associated with the hierarchical software organizational schema components;

based on the weight, the number of processed code lines, and the total number of code lines associated with the hierarchical software organizational schema components, a processor of the computer calculating a test coverage value for the software organizational schema; and the processor of the computer determining a match between the calculated test coverage value and a defined standard, the defined standard indicated by one or more quality indices, wherein, in response to the match of the calculated test coverage value with the defined standard, accepting the test coverage value, and wherein, in response to a failure to match the calculated test coverage value with the defined standard, recursively executing the test-run of the application to calculate the test coverage value that matches the defined standard.

12. The computer implemented of claim 11 further comprising:

defining the quality indices to comply with the defined standard.

13. The computer implemented method of claim 12, wherein the quality indices are based on one or more organizational policies, and one or more types of software organizational schema components associated with the application.

14. The computer implemented method of claim 12 further comprising representing the quality indices with one or more shapes, one or more colors, and a combination thereof.

15. The computer implemented method of claim 11, wherein the quality indices comprises a predefined range of test coverage values.

16. The computer implemented method of claim 11, wherein upon receiving the weight of a zero value corresponding to the hierarchical software organizational schema components, ignoring the corresponding hierarchical software organizational schema components.

17. The computer implemented method of claim 11 further comprising: calculating an overall test coverage value for the software organizational schema including a weighted average of values of the hierarchical software organizational components associated with the application.

18. A computer system for calculating test coverage of a software organizational schema, comprising:
- an organizational database to store a software organizational schema associated with an application, comprising one or more hierarchical software organizational schema components including one or more primary software organizational schema components, one or more secondary software organizational schema components associated with the primary software organizational components, one or more tertiary software organizational schema components associated with the secondary software organizational components, and a plurality of associated code lines;
- a processor;
- a storage in communication with the processor and the organizational database to store:
  - data generated corresponding to a number of processed code lines and a total number of code lines associated with the hierarchical software organizational schema components on execution a test-run of the application; and
  - one or more quality indices;
- a memory in communication with the processor to store instructions related to:
  - a weight assignment module to assign weight to the hierarchical software organizational schema components; and
  - a test coverage calculator module to calculate a test coverage based on the assigned weight, the number of processed lines and the total number of the code lines corresponding to the primary software organizational schema components, the secondary software organizational schema components, the tertiary software organizational schema components of the software organizational schema; and
  - a comparator module to compare the test coverage value with the quality indices to determine a match between the calculated test coverage value and a defined standard, the defined standard indicated by one or more quality indices,
- wherein, in response to the match of the calculated test coverage value with the defined standard, accepting the test coverage value, and
- wherein, in response to a failure to match the calculated test coverage value with the defined standard, recursively executing the test-run of the application to calculate the test coverage value that matches the defined standard.

19. The computer system of claim 18 further comprising:
an output device to display the test coverage value on a user interface.

20. The computer system of claim 18, wherein the test coverage calculator module calculates an overall test coverage value for the software organizational schema including a weighted average of values of the hierarchical software organizational components associated with the application.

* * * * *